United States Patent
Fukuda et al.

[11] Patent Number: 6,001,505
[45] Date of Patent: Dec. 14, 1999

[54] NONAQUEOUS ELECTROLYTE BATTERY

[75] Inventors: Yutaka Fukuda; Koji Hanafusa; Keiichi Tanaka, all of Kanuma, Japan

[73] Assignee: Sumitomo Electric Industries, Ltd., Osaka, Japan

[21] Appl. No.: 08/981,421

[22] PCT Filed: Apr. 23, 1997

[86] PCT No.: PCT/JP97/01397

§ 371 Date: Dec. 23, 1997

§ 102(e) Date: Dec. 23, 1997

[87] PCT Pub. No.: WO97/40540

PCT Pub. Date: Oct. 30, 1997

[30] Foreign Application Priority Data

Apr. 23, 1996 [JP] Japan .................................. 8-101358

[51] Int. Cl.$^6$ .............................. H01M 2/02; H01M 2/30
[52] U.S. Cl. ........................ 429/176; 429/178; 429/304; 429/324
[58] Field of Search ..................... 429/176, 178, 429/175, 304, 324

[56] References Cited

U.S. PATENT DOCUMENTS 5,270,133 12/1993 Bammann, III ..................... 429/176 X

FOREIGN PATENT DOCUMENTS

| | | |
|---|---|---|
| 0 397 248 | 11/1990 | European Pat. Off. . |
| 56-71278 | 6/1981 | Japan . |
| 57-115820 | 7/1982 | Japan . |
| 58-125360 | 8/1983 | Japan . |
| 60-65442 | 4/1985 | Japan . |
| 61-240564 | 10/1986 | Japan . |
| 62-61268 | 3/1987 | Japan . |
| 62-62268 | 3/1987 | Japan . |
| 3-62447 | 3/1991 | Japan . |

*Primary Examiner*—John S. Maples
*Attorney, Agent, or Firm*—Pillsbury Madison & Sutro LLP

[57] ABSTRACT

The present invention provides a nonaqueous electrolyte battery 10 comprising a nonaqueous electrolytic solution 20 which is a nonaqueous electrolytic medium; positive and negative plates 30 and 32 in contact with the nonaqueous electrolytic medium; a first lead 18a having one end connected to the positive plate 30 and the other end extending to the outside; a second lead 18b having one end connected to the negative plate and the other end extending to the outside; and a sealing bag 14 for sealing the positive and negative plates 30 and 32, the nonaqueous electrolytic medium 20, and parts of the first and second leads 18a and 18b therein, the bag 14 being heat-sealed; wherein at least a heat-sealing portion 12 of the sealing bag 14 has a layer comprising a maleic acid modified polyolefin. The maleic acid modified polyolefin has a low hygroscopicity and a low compatibility with the nonaqueous electrolytic solution. Accordingly, high blocking properties against the nonaqueous electrolytic solution and steam are obtained, whereby the sealing bag 14 attains a high hermetic property.

8 Claims, 3 Drawing Sheets

NONAQUEOUS ELECTROLYTE BATTERY

This application is the national phase of international application PCT/JP97/01397, filed Apr. 23, 1997 which designated the U.S.

TECHNICAL FIELD

The present invention relates to a nonaqueous electrolyte battery used as a power source for electronic instruments.

BACKGROUND ART

In conjunction with a demand for electronic instruments having a smaller size, there has been an increasing demand for batteries having a smaller size to be used for their power source. In order to satisfy such a demand for batteries, thinned batteries have been taken into consideration. Known as such batteries are those in which an electrode and an electrolytic solution or the like are sealed into a bag made of a plastic or a combination of a plastic and a metal which are bonded together. Since the reliability of such batteries depends on its hermetic property, various studies have been made as explained in the following.

For example, Japanese Patent Application Laid-Open No. 56-71278 discloses a sheet-like battery. In this battery, while the part occupied by the heat-fusing portion is reduced, a lead which has been coated with a resin beforehand is used to improve the reliability of its heat fusion with respect to the bag.

The bag for sealing the battery system disclosed in Japanese Patent Application Laid-Open No. 56-71278, however, is formed by a single iodine-resistant fluorine resin. Consequently, in the case of a nonaqueous electrolyte battery whose electrolytic solution is volatile or of an organic solvent system, there is a strong tendency for the electrolytic solution to penetrate through the bag to leak out or for moisture to infiltrate therein from the outside, thereby yielding an inferior hermetic property.

On the other hand, Japanese Patent Application Laid-Open No. 3-62447 discloses a battery in which, as a material for a seal portion of a sealing bag, acrylic acid modified polyethylene or acrylic acid modified polypropylene is used.

The battery disclosed in Japanese Patent Application Laid-Open No. 3-62447, however, is disadvantageous in that, since a highly hygroscopic acrylic acid modified polyolefin is used in the bag, moisture is likely to infiltrate therein.

Accordingly, it is an object of the present invention to provide a nonaqueous electrolyte battery having high blocking properties against the nonaqueous electrolytic solution and steam.

DISCLOSURE OF INVENTION

The present invention provides a nonaqueous electrolyte battery comprising a nonaqueous electrolytic medium; positive and negative electrodes in contact with the nonaqueous electrolytic medium; a first lead having one end connected to the positive electrode and the other end extending to the outside; a second lead having one end connected to the negative electrode and the other end extending to the outside; and a bag for sealing the positive and negative electrodes, the nonaqueous electrolytic medium, and parts of the first and second leads therein, the bag being heat-sealed; wherein at least a heat-sealing portion of the bag has a layer comprising a maleic acid modified polyolefin.

The nonaqueous electrolytic medium refers to a nonaqueous electrolytic solution containing an electrolyte, or a solid electrolyte. When the nonaqueous electrolytic medium is a nonaqueous electrolytic solution, in order to prevent it from diffusing, the battery further comprises a separator positioned between the positive and negative electrodes.

The maleic acid modified polyolefin has a low hygroscopicity and a low compatibility with the nonaqueous electrolytic solution. Consequently, at the heat-sealing portion, the blocking properties (barrier properties) against the nonaqueous electrolytic solution and steam are enhanced, thereby improving the hermetic property of the bag.

Also, the heat-sealing portion may be formed at a peripheral part of the bag.

In this case, when the bag is made of a film, its hermetic property is enhanced at the peripheral part.

Also, the present invention may be configured such that peripheral parts of the first and second leads are coated with an insulator, which includes a layer comprising a maleic acid modified polyolefin directly in contact with the peripheral parts of the first and second leads, while the heat-sealing portion is formed at a part where the insulator and the bag connect with each other.

In this case, a gap is restrained from occurring between the peripheral parts of the first and second leads and the bag, thus enhancing the hermetic property.

Also, the first lead, the second lead, or the insulator may have a band-like form.

In this case, even when the capacity of the battery is made larger, the outer periphery of the first lead, second lead, or insulator can be restrained from increasing, so that the first lead, second lead, or insulator can attain a larger cross-sectional area, thereby restraining a gap from occurring at the heat-sealing portion. Accordingly, the reliability of this heat-sealing portion with respect to airtightness is improved.

BEST MODE FOR CARRYING OUT THE INVENTION

For further detailed description, the present invention will be explained with reference to the accompanying drawings. Here, in the drawings, parts identical or equivalent to each other will be referred to with marks identical to each other.

Figure 1:
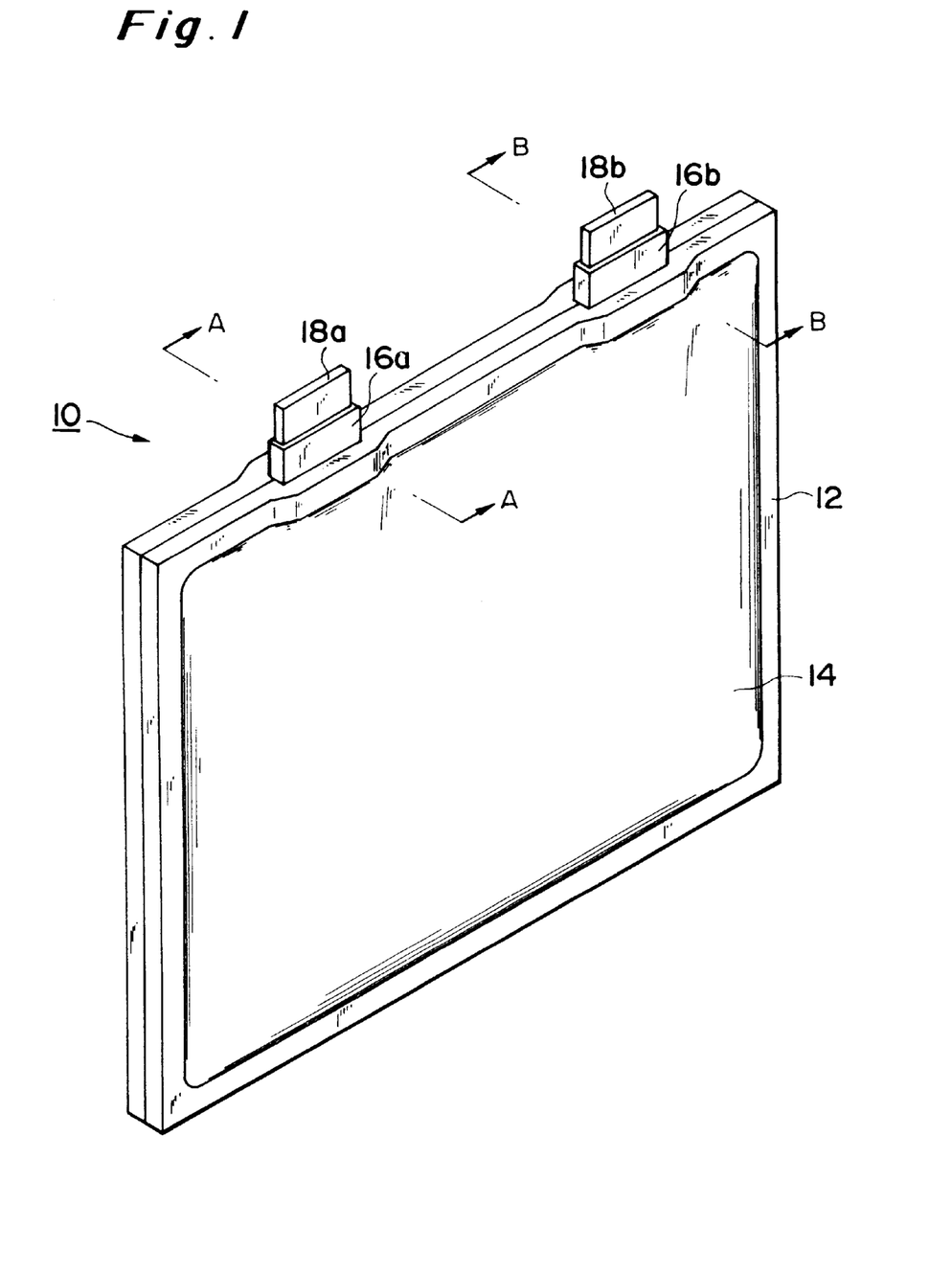
FIG. 1 is a perspective view schematically showing an embodiment of the nonaqueous electrolyte battery in accordance with the present invention.

FIG. 1 is a perspective view schematically showing an embodiment of the nonaqueous electrolyte battery in accordance with the present invention. This nonaqueous electrolyte battery 10 is constituted when a single electrochemical cell containing a nonaqueous electrolytic solution (nonaqueous electrolytic medium) in which an electrolyte (e.g., lithium compound) has been dissolved in a nonaqueous medium (e.g., organic solvent) is sealed in a sealing bag (bag) 14 whose peripheral part has been heat-fused to form a heat-sealing portion 12. From the upper part of the sealing bag 14, one end of each of first and second leads 18a and 18b, respectively coated with insulators 16a and 16b at their peripheral parts, extends upward, thus allowing them to be electrically connected to the outside.

Figure 2:
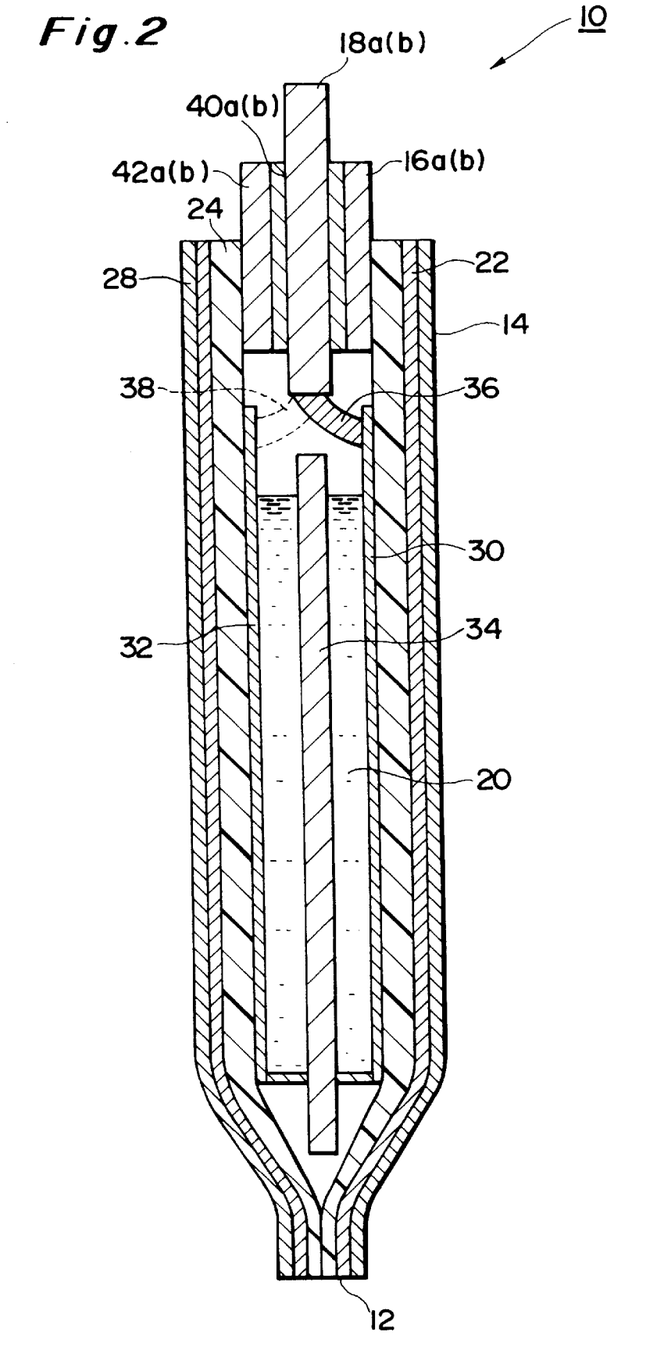
FIG. 2 is a sectional view taken along line A—A or line B—B of FIG. 1.

FIG. 2 is a sectional view of the nonaqueous electrolyte battery 10 taken along line A—A or line B—B of FIG. 1. As depicted, from the viewpoint of restraining a nonaqueous electrolytic solution 20 from infiltrating, the sealing bag 14 is constituted by a multilayer film, which is formed by plastic layers 24 to 28 and a metal foil or metal layer 22 made of aluminum, for example, held therebetween.

More specifically, this sealing bag 14 is formed when the peripheral parts of the innermost layers 24 in contact with the nonaqueous electrolytic solution 20 are heat-fused together. Since the heat-sealing portion 12 is formed at the peripheral parts of the inner layers 24 of the multilayer film, the nonaqueous electrolytic solution 20 may leak out therefrom depending on the material of the inner layers 24.

Hence, the inventors have found that, when a specific material is selected as the material for the inner layers 24 of the multilayer film in which the heat-sealing portion 12 is formed, the nonaqueous electrolytic solution 20 is prevented from penetrating therein and leaking out therefrom, and steam is prevented from infiltrating therein. Namely, the inventors have found that, when the inner layers 24 of the multilayer film, which come into contact with the nonaqueous electrolytic solution 20 and form the heat-sealing portion 12 at their peripheral parts, are made of a layer comprising a maleic acid modified polyolefin, the nonaqueous electrolytic solution 20 is prevented from penetrating therein and leaking out therefrom, and steam is prevented from infiltrating therein.

Such a feature results from the fact that the maleic acid modified polyolefin has a low hygroscopicity and a low compatibility with the above-mentioned nonaqueous electrolytic solution and that it forms a heat-sealing portion having a high sealing property.

As such a maleic acid modified polyolefin, maleic acid modified polyethylene is preferable, for example.

The thickness of the inner layer 24 made of a maleic acid modified polyolefin is preferably within the range of 30 $\mu$m to 200 $\mu$m. When the thickness is smaller than 30 $\mu$m, the heat-sealing property deteriorates. In particular, at a part explained later where the first lead 18a, the second lead 18b, and the sealing bag 14 are connected together by heat-sealing, the heat-sealing property tends to deteriorate. When the thickness is greater than 200 $\mu$m, at the time of heat-sealing, the amount of flowing resin becomes so much that the metal layer 22 may be distorted and, in the worst case, the sealing bag 14 may be damaged.

Further, the layer 28 constituting the multilayer film, together with the metal layer 22 and the inner layer 24 made of a maleic acid modified polyolefin, is preferably made of PET (polyethylene terephthalate). In this case, its resistance to wear tends to improve.

Accordingly, preferred examples of the nonaqueous electrolytic solution employed in this nonaqueous electrolyte battery 10 are those in which a solute comprising a lithium compound such as $LiClO_4$, $LiBF_4$, $LiPF_6$, or $LiAsF_6$ is dissolved in an organic solvent such as propylene carbonate, $\gamma$-butyrolactone, ethylene carbonate, diethyl carbonate, dimethyl carbonate, 1,2-dimethoxyethane, or tetrahydrofuran.

Sealed in the sealing bag 14 are a positive plate 30 and a negative plate 32 which are impregnated with the nonaqueous electrolytic solution 20. Each of the positive plate 30 and negative plate 32 comprises a metal base (not depicted) of a metal foil or expanded metal, which is known as a collector, and an active material layer (not depicted) formed on the metal base. Disposed between the positive plate 30 and the negative plate 32 is a separator 34 for preventing the nonaqueous solution 20 from diffusing. One end of the first lead 18a is connected to a lead 36 on the metal base of the positive plate 30 by spot welding, ultrasonic welding, or the like, for example, whereas its other end extends to the outside of the sealing bag 14 as mentioned above. One end of the second lead 18b is connected to a lead 38 on the metal base of the negative plate 32 by spot welding, ultrasonic welding, or the like, for example, whereas its other end extends to the outside of the sealing bag 14 as mentioned above.

The insulators 16a and 16b respectively disposed so as to cover the peripheral parts of the first and second leads 18a and 18b are heat-fused with the inner layer 24 of the sealing bag 14, thereby securing an airtightness between the first and second leads 18a and 18b and the sealing bag 14. Here, the airtightness also depends on the material of the insulators 16a and 16b. Accordingly, in this embodiment, in order for the insulators 16a and 16b to be integrally formed with the inner layers 24 of the sealing bag 14, interior layers 40a and 40b in contact with the peripheral parts of the first and second leads 18a and 18b are formed by a maleic acid modified polyolefin. Consequently, a high airtightness is secured between the first and second leads 18a and 18b and the sealing bag 14.

The thickness of each of the interior layers 40a and 40b made of a maleic acid modified polyolefin is preferably within the range of 10 $\mu$m to 100 $\mu$m. When the thickness is smaller than 10 $\mu$m, the first and second leads 18a and 18b may not sufficiently come into close contact with each other, whereby the nonaqueous electrolytic solution 20 may leak out. When the thickness is greater than 100 $\mu$m, the heat-sealing property with respect to the sealing bag 14 may deteriorate due to such a thickness.

Referring to FIG. 1 again, each of the insulators 16a and 16b and the first and second leads 18a and 18b has a band-like form (with a flat rectangular cross section). Such a form of the first and second leads 18a and 18b is advantageous when the battery has an increased capacity. It is due to the fact that, in the case of such a form, even when the capacity of the battery is enhanced, the outer peripheries of the insulators 16a and 16b can be restrained from increasing, thus allowing the first and second leads 18a and 18b to have a greater cross-sectional area. Consequently, a gap is restrained from occurring at the heat-sealing portion 12 formed by heat fusion between exterior layers 42a and 42b disposed outside the interior layers 40a and 40b of the insulators 16a and 16b and the inner layer 22 of the sealing bag 14. Accordingly, the reliability concerning airtightness is improved at the heat-sealing portion 12.

By contrast, in the case where the first or second lead has a circular cross section, when the battery has a large capacity, the outer periphery of the insulator becomes longer as the diameter of the cross section of the first or second lead increases. Consequently, at the above-mentioned heat-sealing portion, a gap is likely to occur, whereby the reliability concerning airtightness tends to deteriorate at the heat-sealing portion.

Also, the first and second leads 18a and 18b shaped like those in this embodiment each have a large contact area. Consequently, for example, they can be connected to an external circuit using an FPC (flexible printed circuit board) or the positive and negative electrodes more easily by spot welding or ultrasonic welding, while enabling connection with a high reliability.

The first lead 18a connected to the positive plate is preferably made of a material which does not dissolve at the time of discharging, e.g., aluminum, titanium, or their alloy. The second lead 18b connected to the negative plate is preferably made of a material which does not form a deposit at the time of overcharging or which is hard to form an alloy and dissolve at the time of over-discharging during which the potential difference is greater, e.g., nickel, copper, or their alloy. Hence, when such a material is used for the second lead 18b of the negative plate, for example, lithium is restrained from depositing at the time of overcharging, and a lithium alloy is restrained from being formed at the time of over-discharging.

In the following, a method of making the nonaqueous electrolyte battery will be explained. First, a method of making a positive plate will be explained.

Initially, an active material for the positive electrode is dissolved into an appropriate solvent so as to yield a paste, which is then applied to a metal base such as an aluminum foil except for its portion where the lead is to be attached. Thereafter, with the active material dried, the metal base is subjected to roller-pressing, whereby the positive plate is obtained. The method of making a negative plate is substantially the same as that of making the positive plate except that an active material for the negative electrode is applied to a metal base such as a copper foil.

In the following, a method of making a sealing bag will be explained.

Initially, a plurality of sheets of multilayer films each including a layer made of a maleic acid modified polyolefin on its surface and a metal foil or metal layer therein are prepared and cut into rectangles with an appropriate size. Then, the multilayer films are superposed on each other such that their maleic acid modified polyolefin layers oppose each other. In this state, a sealing machine is used so as to heat-seal three surrounding sides of the rectangle by a desired sealing width under a predetermined heating condition, whereby a pouched sealing bag is obtained.

Between thus obtained positive and negative plates, a microporous diaphragm (separator) made of polypropylene, for example, is disposed. Then, a first lead for the positive plate, which has a rectangular cross section and is made of aluminum, for example, and a second lead for the negative plate, which has a rectangular cross section and is made of copper, for example, are prepared. An insulator layer is formed at the peripheral part of each of the first and second leads. Thereafter, the parts of metal bases for the positive and negative electrodes not coated with the active materials are respectively connected to the first and second leads by ultrasonic welding.

In this state, the positive plate, the negative plate, the first lead, the second lead, and the like were accommodated in the sealing bag. Thereafter, a desired nonaqueous electrolytic solution is injected therein. Then, while insulators for the first and second leads are held by the peripheral part of the opening portion of the sealing bag, the sealing machine is used to heat-fuse together the exterior layers of the insulators of the first and second leads and the inner layers of the peripheral part of the sealing bag by a desired width under a predetermined heating condition, whereby a nonaqueous electrolyte battery is obtained.

Figure 3:
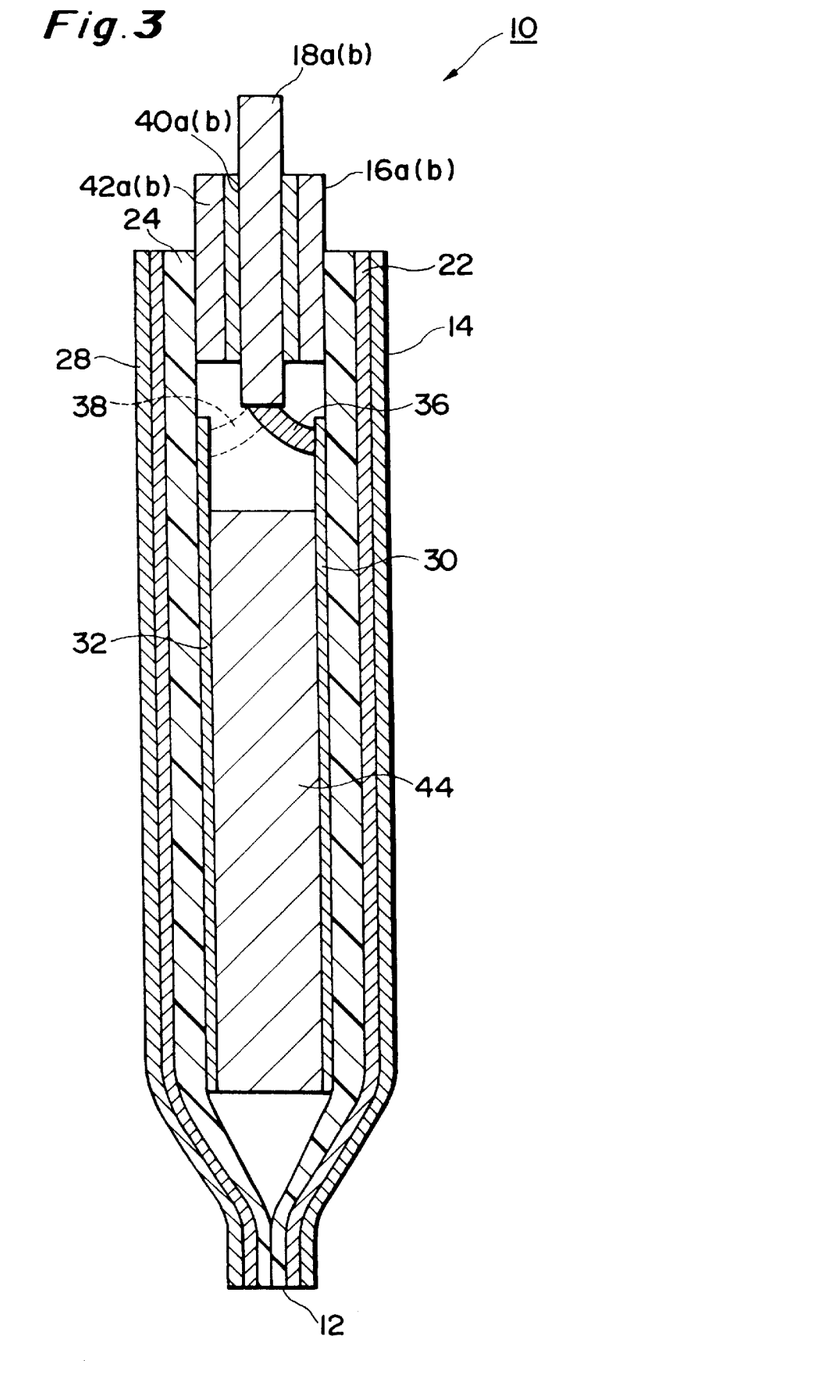
FIG. 3 is a sectional view schematically showing another embodiment of the nonaqueous electrolyte battery in accordance with the present invention.

Here, the nonaqueous electrolyte battery is not restricted to that mentioned above. The sectional view of FIG. 3 shows another embodiment of the present invention, i.e., a nonaqueous electrolyte battery 10 whose nonaqueous electrolyte is a solid electrolyte 44.

The nonaqueous electrolyte battery 10 of this embodiment has a configuration substantially the same as that of the first embodiment except that there is no separator, since the nonaqueous electrolyte is the solid electrolyte 44 as mentioned above.

Accordingly, in this embodiment, since the sealing bag 14 similar to that in the first embodiment is used, the heat-sealing portion 12 has an enhanced blocking property against steam, whereby the nonaqueous electrolyte battery of this embodiment can stably operate with a high reliability.

In the following, the present invention will be explained in detail with reference to Examples and Comparative Examples, which by no means restrict the present invention.

EXAMPLES

Examples 1 and 2 and Comparative Examples 1 to 14

First, a positive plate was made as follows. Initially, 100 parts by weight of $LiCoO_2$ powder (manufactured by Nippon Chemical Industrial Co., Ltd.), 10 parts by weight of graphite, and 10 parts by weight of polyvinylidene fluoride were used as active materials for the positive electrode and mixed together. Subsequently, the mixture of $LiCoO_2$, graphite, and polyvinylidene fluoride was dissolved in N-methyl-2-pyrrolidone and then was turned into a paste form. Thus obtained paste-like mixture was applied to one side of an aluminum foil having a thickness of 20 $\mu$m, except for its portion where a lead was to be connected. Thereafter, the mixture was dried and then was subjected to roller-pressing, whereby a positive plate having a thickness of 0.1 mm, a width of 50 mm, and a length of 105 mm was obtained.

Next, a negative plate was made. Namely, 100 parts by weight of flake natural graphite powder and 20 parts by weight of polyvinylidene fluoride were used as active materials for the negative electrode and mixed together. Subsequently, the resulting mixture was dissolved in N-methyl-2-pyrrolidone and then was turned into a paste form. Thus obtained paste-like mixture was applied to both sides of a copper foil having a thickness of 20 $\mu$m, except for its portion where a lead was to be connected. Thereafter, the mixture was dried and then was subjected to roller-pressing, whereby a negative plate having a thickness of 0.1 mm, a height of 50 mm, and a width of 105 mm was obtained.

Next, a sealing bag was made. Initially, a plurality of sheets of multilayer films each comprising first to fourth layers as shown in Table 1 were prepared and cut into rectangles each having a height of 70 mm and a width of 135 mm. Then, the multilayer films were superposed on each other such that their fourth layers opposed each other. In this state, a sealing machine was used to heat-seal three surrounding sides of the rectangle with a sealing width of 5 mm by heating them for 5 seconds at 200° C., whereby a pouched sealing bag was obtained.

TABLE 1

|  | A | B | C | D | E | F | G |
|---|---|---|---|---|---|---|---|
| 1ST LAYER | PET (12 $\mu$m) | PET (12 $\mu$m) | PET (12 $\mu$m) | PET (12 $\mu$m) | PET (12 $\mu$m) | PET (12 $\mu$m) | PET (12 $\mu$m) |
| 2ND LAYER | PE (15 $\mu$m) | PE (15 $\mu$m) | PE (15 $\mu$m) | PE (15 $\mu$m) | PE (15 $\mu$m) | PE (15 $\mu$m) | PE (15 $\mu$m) |
| 3RD LAYER | ALUMINUM (7 $\mu$m) | ALUMINUM (7 $\mu$m) | ALUMINUM (7 $\mu$m) | ALUMINUM (7 $\mu$m) | ALUMINUM (7 $\mu$m) | ALUMINUM (7 $\mu$m) | ALUMINUM (7 $\mu$m) |
| 4TH LAYER | MALEIC ACID | MALEIC ACID | ACRYLIC ACID | SILANE MODIFIED | PVdF (100 $\mu$m) | ACRYLIC ACID | ACRYLIC ACID |

TABLE 1-continued

| A | B | C | D | E | F | G |
|---|---|---|---|---|---|---|
| MODIFIED LDPE (100 μm) | MODIFIED PP (100 μm) | MODIFIED EVA (100 μm) | EEA (100 μm) | | MODIFIED PE (100 μm) | MODIFIED PP (100 μm) |

PET: POLYETHYLENE TEREPHTHALATE
PE: POLYETHYLENE
PP: POLYPROPYLENE
EVA: ETHYLENE/VINYL ACETATE COPOLYMER
EEA: ETHYLENE ETHYL ACRYLATE
PVdF: POLYVINYLIDENE FLUORIDE

A microporous diaphragm made of polypropylene was disposed between thus obtained positive and negative plates. Here, the thickness of the diaphragm was 25 μm.

Then, as the first lead for the positive plate, a rectangular aluminum conductor having a cross section with a thickness of 0.1 mm and a width of 4 mm was prepared. Also, as the second lead for the negative plate, a rectangular copper conductor having a cross section with a thickness of 0.1 mm and a width of 4 mm was prepared. Then, peripheral parts of such first and second leads were coated with insulating layers each comprising interior and exterior layers as shown in Table 2. Thereafter, the part of aluminum foil for the positive plate not coated with the active material was connected to the first lead by ultrasonic welding. Also, the part of copper foil for the negative plate not coated with the active material was connected to the second lead by ultrasonic welding.

In this state, the positive plate, the negative plate, the first lead, the second lead, and the like were accommodated in the sealing bag, and then 8 cc of a nonaqueous electrolytic solution was injected therein. Here, used as the nonaqueous electrolytic solution was the one comprising a mixed solvent of ethylene carbonate and diethyl carbonate at a volume ratio of 1:1 and lithium hexafluorophosphate dissolved therein with a concentration of 1 mol/l.

Thereafter, the insulators for the first and second leads were held by the peripheral part of the opening portion of the sealing bag. Then, the sealing machine was used to heat-fuse together the exterior layers of the insulators of the first and second leads and the inner layers of the peripheral part of the sealing bag, whereby sample batteries constituted by combinations of the multilayer films shown in Table 1 and the insulators of the first and second leads shown in Table 2 were obtained as shown in Table 3. Here, the sealing width was 10 mm, whereas the heating was effected for 5 seconds at 200° C.

Thus obtained sample batteries were subjected to a constant temperature and humidity test, by which their properties were investigated. In the constant temperature and humidity test, the sample batteries were held for 720 hours in an RH thermo-hygrostat in which temperature was 60° C. and humidity was 95%, and then their change in weight and the change in moisture cocentration in the nonaqueous electrolytic solution were measured, so as to evaluate the blocking properties of the heat-sealing portion against the nonaqueous electrolytic solution and steam. Here, the moisture cocentration in the nonaqueous electrolytic solution was measured by Karl Fischer technique.

TABLE 2

| a | b | c | d | e | f | g |
|---|---|---|---|---|---|---|
| INTERIOR LAYER | | | | | | |
| MALEIC ACID MODIFIED LOW-DENSITY POLYETHYLENE (40 μm) | MALEIC ACID MODIFIED POLYPROPYLENE (100 μm) | ACRYLIC ACID MODIFIED ETHYLENE/ VINYL ACETATE COPOLYMER (100 μm) | SILANE MODIFIED ETHYLENE ETHYL ACRYLATE (100 μm) | ACRYLIC ACID MODIFIED POLYETHYLENE (100 μm) | POLY- VINYLIDENE FLUORIDE (100 μm) | ACRYLIC ACID MODIFIED POLYPROPYLENE (100 μm) |
| EXTERIOR LAYER | | | | | | |
| HIGE-DENSITY POLYETHYLENE (60 μm) | | | | | | |

TABLE 3

| | MULTILAYER FILM OF SEALING BAG | MATERIAL FOR LEAD INSULATOR |
|---|---|---|
| EXAMPLE 1 | A | a |
| EXAMPLE 2 | B | b |
| COMPARATIVE EXAMPLE 1 | A | c |
| COMPARATIVE EXAMPLE 2 | A | d |
| COMPARATIVE EXAMPLE 3 | A | e |
| COMPARATIVE EXAMPLE 4 | B | g |
| COMPARATIVE EXAMPLE 5 | C | a |
| COMPARATIVE EXAMPLE 6 | C | c |
| COMPARATIVE EXAMPLE 7 | C | e |
| COMPARATIVE | D | a |

TABLE 3-continued

| | MULTILAYER FILM OF SEALING BAG | MATERIAL FOR LEAD INSULATOR |
|---|---|---|
| EXAMPLE 8 | | |
| COMPARATIVE EXAMPLE 9 | D | d |
| COMPARATIVE EXAMPLE 10 | E | f |
| COMPARATIVE EXAMPLE 11 | F | a |
| COMPARATIVE EXAMPLE 12 | F | e |
| COMPARATIVE EXAMPLE 13 | G | b |
| COMPARATIVE EXAMPLE 14 | G | g |

TABLE 4

| | AMOUNT OF EVAPORATED ELECTROLYTIC SOLUTION (WT %) | MOISTURE CONCENTRATION (ppm) |
|---|---|---|
| EXAMPLE 1 | 1.2 | 7 |
| EXAMPLE 2 | 1.1 | 9 |
| COMPARATIVE EXAMPLE 3 | 1.1 | 54 |
| COMPARATIVE EXAMPLE 4 | 1.3 | 62 |
| COMPARATIVE EXAMPLE 10 | 2.8 | 74 |
| COMPARATIVE EXAMPLE 11 | 1.0 | 83 |
| COMPARATIVE EXAMPLE 12 | 1.1 | 120 |
| COMPARATIVE EXAMPLE 13 | 1.1 | 92 |
| COMPARATIVE EXAMPLE 14 | 1.2 | 132 |

As a result, the nonaqueous electrolytic solution was found to leak out in Comparative Examples 1, 2, and 5 to 9. Also, the other test results were shown in Table 4. Namely, in Comparative Examples, it was found that the amount of evaporation of the nonaqueous electrolytic solution became so large, due to the leaking thereof, that the blocking property against the nonaqueous electrolytic solution became insufficient, or that the blocking property against steam became insufficient due to their moisture cocetration higher than that in Examples.

By contrast, both the amount of evaporated nonaqueous electrolytic solution and moisture cocentration in Examples 1 and 2 were low. Accordingly, it was found that Examples 1 and 2 have high blocking properties against the nonaqueous electrolytic solution and steam, and that a maleic acid modified polyolefin was excellent as the material for the heat-sealing portion.

Next, the samples of Examples 1 and 2 and Comparative examples 3, 4, and 10 to 14, which did not cause leaking in the constant temperature and humidity test, were subjected to a cyclic charging and discharging test. Namely, each sample battery was subjected to a cyclic charging and discharging test in which the current density was 0.4 mA/cm$^2$ and the charging and discharging voltage was within the range of 2.75 to 4.1 V. The results thereof are shown in Table 5.

TABLE 5

| | 10-CYCLE DISCHARGED CAPACITY (mAh) | 300-CYCLE DISCHARGED CAPACITY (mAh) |
|---|---|---|
| EXAMPLE 1 | 126 | 102 |
| EXAMPLE 2 | 124 | 100 |
| COMPARATIVE EXAMPLE 3 | 123 | 84 |
| COMPARATIVE EXAMPLE 4 | 127 | 80 |
| COMPARATIVE EXAMPLE 10 | 125 | 79 |
| COMPARATIVE EXAMPLE 11 | 126 | 71 |
| COMPARATIVE EXAMPLE 12 | 124 | 65 |
| COMPARATIVE EXAMPLE 13 | 125 | 72 |
| COMPARATIVE EXAMPLE 14 | 126 | 51 |

According to Table 5, it was found that the discharged capacity in each of Examples 1 and 2 at 300 cycles was about 80% of its discharged capacity at the initial 10 cycles, thus being maintained at a high level. By contrast, the discharged capacity in each of Comparative Examples 3, 4, and 10 to 14 was found to be greatly lowered at 300 cycles. Accordingly, also from the results of the cyclic test for the battery, it was found that the maleic acid modified polyolefin was excellent as the material for the heat-sealing portion.

Examples 3 and 4 and Comparative Examples 15 to 18

Sample batteries respectively identical to those of Examples 1 and 2 and Comparative Examples 5, 8, 10, and 13, except that the first and second leads were put into the sealing bag, were made and subjected to a constant temperature and humidity test. As a result, it was found that blocking properties against both nonaqueous electrolytic solution and steam were excellent in the cases of Examples 3 and 4 whose multilayer films were respectively A and B. By contrast, in the cases of Comparative Examples 15 and 16 whose multilayer films were respectively C and D, it was found that the resins of the multilayer films were dissolved to generate leaking. Also, in the cases of Comparative Examples 17 and 18 whose multilayer films were respectively E, F and G, it was found that, even when the first and second leads were not held thereby, at least one of blocking properties against the nonaqueous electrolytic solution and steam was insufficient. Accordingly, it was found that the maleic acid modified polyolefin was excellent as the material for the heat-sealing portion.

Examples 5 and 6

Sample batteries respectively identical to those of Examples 1 and 2, except that the first and second leads had circular cross sections, were made, and their hermetic properties were observed. As a result, it was found that, the hermetic properties in Examples 5 and 6 were inferior to those in Examples 1 and 2, though being superior to those in Comparative Examples 1 to 14. Accordingly, the fact that the first and second leads have a band-like form was found to be effective for the hermetic property of the sealing bag.

Industrial Applicability

In the present invention, since at least the heat-sealing portion of the bag has a layer comprising a maleic acid modified polyolefin, the non-aqueous electrolytic solution can attain high blocking properties against the nonaqueous electrolytic solution and steam. Also, since the first and second leads of the nonaqueous electrolyte battery have band-like forms, even when the capacity of the battery is made larger, the outer peripheries of the first and second leads are restrained from increasing, thus allowing the first and first leads to have larger cross-sectional areas, by which a gap is kept from occurring at the heat-sealing portion. Accordingly, the reliability of the heat-sealing portion with respect to air-tightness is improved.

We claim:

1. A nonaqueous electrolyte battery comprising:
   a nonaqueous electrolyte medium;
   positive and negative electrodes in contact with said nonaqueous electrolytic medium;
   a bag for sealing said nonaqueous electrolytic medium, and said positive and negative electrodes, wherein said bag is heat-sealed and at least a portion of said heat-sealed bag includes a layer comprising a maleic acid modified polyolefin;
   a first lead having one end connected to said positive electrode and the other end extending outside said bag, said first lead being made of a metal selected from the group consisting of aluminum, aluminum alloy, titanium and titanium alloy; and
   a second lead having one end connected to said negative electrode and the other end extending outside said bag, said second lead being made of a metal selected from the group consisting of nickel, nickel alloy, copper and copper alloy.

2. A nonaqueous electrolyte battery according to claim 1, further comprising a separator disposed between said positive and negative electrodes.

3. A nonaqueous electrolyte battery according to claim 1, wherein said nonaqueous electrolytic medium is a solid electrolyte.

4. A nonaqueous electrolyte battery according to claim 1, wherein said portion to be heat-sealed is formed at a peripheral part of said bag.

5. A nonaqueous electrolyte battery according to claim 1, wherein said first and second leads have band-like forms.

6. A nonaqueous electrolyte battery according to claim 1, wherein peripheral parts of said first and second leads are coated with an insulator, said insulator including a layer directly in contact with the peripheral parts of said leads, said layer comprising a maleic acid modified polyolefin; and
   wherein said portion to be heat-sealed is formed at a part where said insulator and said bag connect with each other.

7. A nonaqueous electrolyte battery according to claim 6, wherein said insulator has a band-like form.

8. A nonaqueous electrolyte battery comprising:
   a nonaqueous electrolyte solution;
   positive and negative electrodes in contact with said nonaqueous electrolytic solution;
   a bag for sealing said nonaqueous electrolytic solution, and said positive and negative electrodes, wherein said bag is heat-sealed and at least a portion of said heat-sealed bag includes a layer comprising a maleic acid modified polyolefin;
   a first lead having one end connected to said positive electrode and the other end extending outside said bag, wherein said first lead is a metal selected from the group consisting of aluminum, titanium and their alloy; and
   a second lead having one end connected to said negative electrode and the other end extending outside said bag, wherein said second lead is a metal selected from the group consisting of nickel, copper and their alloy.

* * * * *

UNITED STATES PATENT AND TRADEMARK OFFICE
CERTIFICATE OF CORRECTION

PATENT NO. : 6,001,505
DATED : December 14, 1999
INVENTOR(S) : Yutaka Fukuda; Koji Hanafusa: Keiichi Tanaka It is certified that error appears in the above-identified patent and that said Letters Patent is hereby corrected as shown below:

On the title page: Item [54] and Column 1, line 3, Title:
should read --NONAQUEOUS ELECTROLYTE CELL"

Signed and Sealed this

Ninth Day of January, 2001

Attest:

Q. TODD DICKINSON

*Attesting Officer*  *Commissioner of Patents and Trademarks*